US009577553B2

United States Patent
Eggeling et al.

(10) Patent No.: US 9,577,553 B2
(45) Date of Patent: Feb. 21, 2017

(54) DRIVE ARRANGEMENT THE MOTOR-OPERATED ADJUSTMENT OF AN ADJUSTING ELEMENT IN A MOTOR VEHICLE

(71) Applicant: Brose Fahrzeugteile GmbH & Co. KG, Hallstadt, Hallstadt (DE)

(72) Inventors: Juergen Eggeling, Muelheim an der Ruhr (DE); Dirk Hellmich, Duisburg (DE); Klaus Duenne, Ratingen (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 174 days.

(21) Appl. No.: 13/899,345

(22) Filed: May 21, 2013

(65) Prior Publication Data

US 2014/0049194 A1 Feb. 20, 2014

(30) Foreign Application Priority Data

May 21, 2012 (DE) .................. 10 2012 009 856

(51) Int. Cl.
*H02P 5/68* (2006.01)
*H02M 1/44* (2007.01)
(Continued)

(52) U.S. Cl.
CPC ............. *H02P 5/68* (2013.01); *E05F 15/611* (2015.01); *E05F 15/622* (2015.01); *H02M 1/44* (2013.01);
(Continued)

(58) Field of Classification Search
CPC .................................... H02P 5/68; H02M 1/44
(Continued)

(56) References Cited

U.S. PATENT DOCUMENTS 5,489,831 A * 2/1996 Harris ........................... 318/701
6,433,507 B1 8/2002 Makaran et al.
(Continued)

FOREIGN PATENT DOCUMENTS

DE 202007005749 12/2007

OTHER PUBLICATIONS

Search Report from the State Intellectual Property Office of People's Republic China, corresponding to this application U.S. Appl. No. 13/899,345, dated Sep. 2, 2015, 2 pages.

*Primary Examiner* — Kawing Chan
(74) *Attorney, Agent, or Firm* — Pauly, Devries Smith & Deffner, LLC

(57) ABSTRACT

The invention relates to a drive arrangement for the motor-operated adjustment of an adjusting element in a motor vehicle, wherein the drive arrangement comprises two electrical drives having in each case a drive motor and a control device, wherein in the assembled state the drives act in the same manner on the adjusting element and are embodied in an essentially identical manner apart from deviations that are a result of tolerances, wherein the control device influences the two drive motors by a pulse width modulation voltage ("PWM" voltage). It is proposed that the control device influences the two drive motors by PWM voltages having PWM switching frequencies that vary continuously during the adjustment process in such a manner that the PWM switching frequencies that are allocated to the two drive motors are different from each other at least for periods of time.

15 Claims, 2 Drawing Sheets

(51) Int. Cl.
    *H02P 7/29*         (2016.01)
    *E05F 15/611*     (2015.01)
    *E05F 15/622*     (2015.01)
    *H02P 31/00*      (2006.01)

(52) U.S. Cl.
    CPC .............. *H02P 7/29* (2013.01); *E05Y 2201/43* (2013.01); *E05Y 2400/41* (2013.01); *E05Y 2800/21* (2013.01); *E05Y 2900/546* (2013.01); *H02P 31/00* (2013.01)

(58) Field of Classification Search
    USPC ..................................................... 318/34, 45
    See application file for complete search history.

(56) References Cited

U.S. PATENT DOCUMENTS

| | | | |
|---|---|---|---|
| 6,891,342 B2* | 5/2005 | Nakamura et al. | ............. 318/77 |
| 8,228,098 B2* | 7/2012 | Zhao et al. | ................... 327/114 |
| 8,766,563 B2 | 7/2014 | Eggelin et al. | |
| 2003/0142963 A1* | 7/2003 | Nadeau | ......................... 388/804 |
| 2004/0027105 A1 | 2/2004 | Nakamura et al. | |
| 2010/0320950 A1* | 12/2010 | Inoue et al. | ............. 318/400.26 |
| 2011/0271595 A1 | 11/2011 | Eggeling et al. | |
| 2012/0146565 A1* | 6/2012 | Parenti | ......................... 318/503 |
| 2013/0077359 A1* | 3/2013 | Lindemann et al. | ........... 363/39 |

\* cited by examiner

DRIVE ARRANGEMENT THE MOTOR-OPERATED ADJUSTMENT OF AN ADJUSTING ELEMENT IN A MOTOR VEHICLE

CROSS-REFERENCE TO RELATED APPLICATIONS

This application claims the benefit of German Patent Application DE 10 2012 009 856.1, filed May 21, 2012, the disclosure of which is incorporated by reference herein in its entirety.

FIELD OF THE INVENTION

The invention relates to a drive arrangement for the motor-operated adjustment of a closure element in a motor vehicle, a control device for a drive arrangement of this type, and a method for the motor-operated adjustment of an adjusting element. The term "closure element" is to be understood here in an inclusive manner. It includes tailgates, boot lids, engine bonnets, side doors, sliding doors, elevating roofs, sliding windows, etc. However, the drive arrangement in question is primarily applied in tailgates and side doors in motor vehicles. They are used for the motor-operated adjustment of the respective closure element in the closing direction and in the opening direction.

BACKGROUND

The known drive arrangement (DE 10 2008 057 014 A1) on which the invention is based is equipped with two electrical spindle drives which each have a drive motor. In order to counteract any uneven wear of the two drives that are embodied in an identical manner, a control device ensures that the two drive motors are supplied with an identical amount of drive power.

The control device acts upon the two drive motors with a pulse width modulation voltage ("PWM" voltage) in order to be able to ensure as low as possible a power loss when controlling the rotational speed or torque of the drive motors. In the case of the PWM power control of consumers, in this case drive motors, the problem quite generally arises that interfering harmonic waves are formed, the frequency of which regularly amounts to many times the switching frequency of the respective PWM voltage. This can be particularly problematic with respect to the electromagnetic compatibility (EMC).

U.S. Pat. No. 6,433,507 B1 discloses one approach for reducing EMC interference when controlling the PWM power. This document proposes to continuously vary the duty cycle, in other words the ratio of high duration time to low duration time of a PWM pulse, during the motor-operated adjustment. As a consequence, the above-mentioned interference is reduced in a simple manner.

SUMMARY

The object of the invention is to embody and further develop the known drive arrangement in such a manner that the EMC compatibility is optimized in particular with respect to the existence of two drive motors.

The above object is achieved in the case of a drive arrangement for the motor-operated adjustment of an adjusting element in a motor vehicle, wherein the drive arrangement comprises two electrical drives having in each case a drive motor and a control device, wherein in the assembled state the drives act in the same manner on the adjusting element and are embodied in an essentially identical manner apart from deviations that are a result of tolerances, wherein the control device influences the two drive motors with pulse width modulation ("PWM") voltages, wherein the control device influences the two drive motors by PWM voltages having PWM switching frequencies that vary particularly continuously in such a manner that the PWM switching frequencies that are allocated to the two drive motors are different from each other at least for periods of time.

An essential aspect is the fundamental consideration that the two drive motors operate at different PWM switching frequencies at least for periods of time. Consequently, each drive motor is allocated its "individual" switching frequency. The resulting effect resides in the fact that the EMC interference that is caused by the two drive motors is not intensified or actually summated. On the contrary, the EMC interference is distributed over a plurality of switching frequencies and their harmonic waves.

The term "switching frequency" is primarily the reciprocal value of the duration period of a PWM pulse, in other words the reciprocal value of the sum of the high duration time and the low duration time.

It is possible with the proposed solution to achieve a particularly low interference emission, wherein costly measures for suppressing interference, in particular hardware-intensive measures, can be omitted. The proposed solution can be achieved in a fully mathematical manner, in other words by way of software.

In the case of a particularly preferred embodiment, the PWM switching frequencies that are allocated to the two drives are at least independent of each other for periods of time. The term "independent" is understood in this case to be in a mathematical sense such that any particular switching frequency that occurs in the case of one drive does not have any influence on the switching frequency that occurs on the other drive. Consequently, any intensification, in particular summation, of the interference is to a great extent prevented.

In the case of a further preferred embodiment, a middle PWM switching frequency is provided that forms the mean value with respect to time of the PWM switching frequencies of a drive. In a particularly preferred embodiment, the middle PWM switching frequency that is allocated to the one drive is identical to the middle PWM switching frequency that is allocated to the other drive.

In the case of a further preferred embodiment, the frequency variation is performed on the basis of the high duration period and accordingly the low duration period of the PWM pulses being shortened or lengthened respectively. Consequently the frequency variation can be performed as described above in a purely mathematical manner without having to modify the clock pulse frequency of a clock pulse generator or the like.

According to an embodiment, the control device for the proposed drive arrangement as such is claimed. Reference is made to all the explanations relating to the drive arrangement that are suitable for describing the control device.

According to an embodiment, a method for the motor-operated adjustment of an adjusting element by means of the proposed drive arrangement is claimed.

It is essential according to this further doctrine that the two drive motors are influenced by PWM voltages having PWM switching frequencies that vary continuously during the adjustment process in such a manner that the PWM switching frequencies that are allocated to the two drives are different at least for periods of time.

The proposed method corresponds to the operating method of the drive arrangement so that reference is made also in this respect to all the explanations relating to the proposed drive arrangement.

In an embodiment, the invention provides a drive arrangement for the motor-operated adjustment of an adjusting element in a motor vehicle, wherein the drive arrangement comprises two electrical drives having in each case a drive motor and a control device, wherein in the assembled state the drives act in the same manner on the adjusting element and are embodied in an essentially identical manner apart from deviations that are a result of tolerances, wherein the control device influences the two drive motors with pulse width modulation ("PWM") voltages, wherein the control device influences the two drive motors by PWM voltages having PWM switching frequencies that vary particularly continuously in such a manner that the PWM switching frequencies that are allocated to the two drive motors are different from each other at least for periods of time.

In one embodiment, the control device adjusts the PWM voltages of the two drive motors so that the level of electrical power consumed by each of the two drive motors is identical.

In one embodiment, the PWM switching frequencies that are allocated to the two drive motors are essentially continuously different.

In one embodiment, the control device generates the PWM switching frequencies that are allocated to the two drive motors in such a manner that the two resulting PWM switching frequencies are independent of each other at least for periods of time.

In one embodiment, the control device generates the PWM switching frequencies that are allocated to the two drive motors in such a manner that the resulting frequency variations are correlated with each other at least for periods of time.

In one embodiment, the PWM switching frequencies that are allocated to the two drive motors are constant in the case of a time-related averaging.

In one embodiment, the control device for the two drive motors comprises in each case a PWM generator and in each case a pseudo-random generator, on which the respective frequency variation is based.

In one embodiment, the frequency variation is performed in a cyclic manner at a predetermined shift frequency.

In one embodiment, the frequency variation is performed on the basis of a jump between different PWM switching frequencies—"frequency hopping", or in that the frequency variation is performed on the basis of the PWM switching frequency continuously rising and falling—"frequency sweeping".

In one embodiment, the PWM switching frequency lies in the kHz range, and/or in that the shift frequency lies in a range between 100 Hz and 10 kHz, in particular in that the shift frequency lies in a range between 200 Hz and 5 kHz.

In one embodiment, the PWM switching frequency lies in a frequency band between 15 kHz and 25 kHz.

In one embodiment, the frequency variation is performed on the basis of the high duration period or respectively the low duration period of the PWM pulses being shortened or lengthened respectively.

In one embodiment, the control device comprises a power controller that supplies electrical power in each case to the two drive motors and in that the frequency variation is performed in such a manner that the required power is supplied.

In an embodiment, the invention provides a control device for a drive arrangement for the motor-operated adjustment of an adjusting element in a motor vehicle, wherein the drive arrangement comprises two electrical drives having in each case a drive motor, wherein in the assembled state the drives act in the same manner on the adjusting element and are embodied in an essentially identical manner apart from deviations that are a result of tolerances, wherein the control device influences the two drive motors by a PWM voltage, wherein the control device influences the two drive motors by PWM voltages having PWM switching frequencies that vary continuously during the adjustment process in such a manner that the PWM switching frequencies that are allocated to the two drive motors are different from each other at least for periods of time.

In an embodiment, the invention provides a method for the motor-operated adjustment of an adjusting element in a motor vehicle by means of a drive arrangement, wherein the drive arrangement comprises two electrical drives having in each case a drive motor and a control device, wherein in the assembled state the drives act in the same manner on the adjusting element and are embodied in an essentially identical manner apart from deviations that are a result of tolerances, wherein the two drive motors are influenced by a PWM voltage wherein the two drive motors are influenced by PWM voltages having PWM switching frequencies that vary continuously during the adjustment process in such a manner that the PWM switching frequencies that are allocated to the two drive motors are different from each other at least for periods of time.

BRIEF DESCRIPTION OF THE FIGURES

The invention is further explained hereinunder with reference to only one drawing that illustrates an exemplary embodiment. In the drawing.

DETAILED DESCRIPTION

Figure 1:
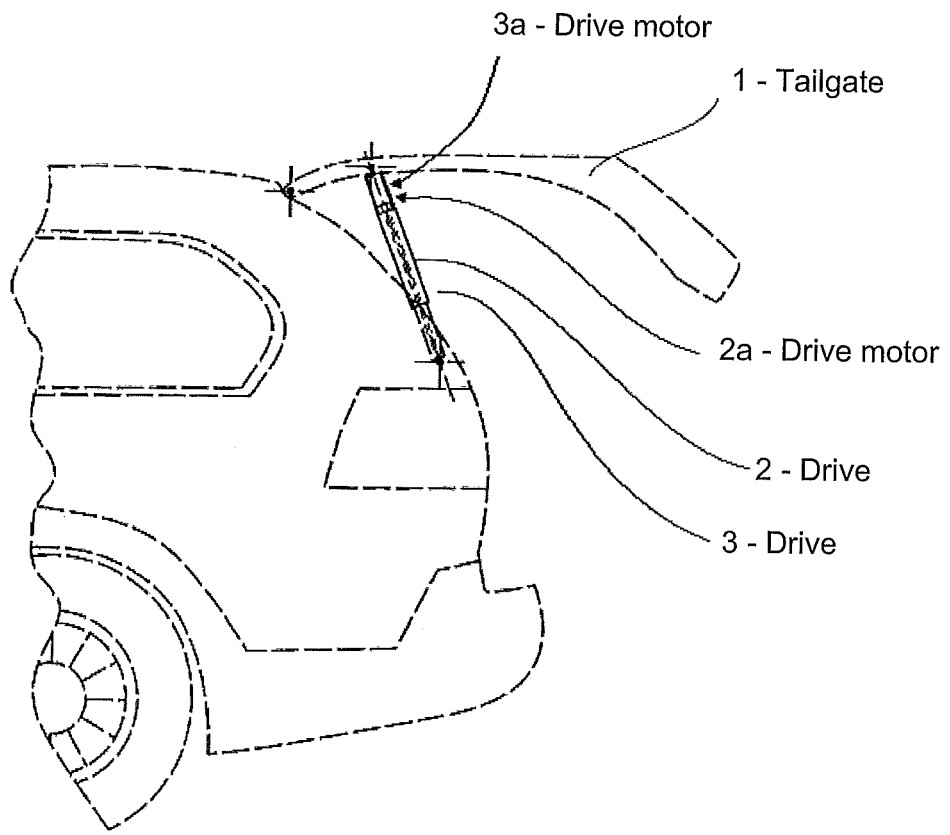
FIG. 1 shows a lateral view of the rear of a motor vehicle including a tailgate and a proposed drive arrangement for the motor-operated adjustment of the tailgate.

The proposed drive arrangement is used for the motor-operated adjustment of an adjusting element 1 in a motor vehicle. The drawing relates to the use of the drive arrangement for an adjusting element 1 that is embodied as a tailgate. This can be regarded as advantageous but it is not to be regarded as limiting. The following explanations therefore relate almost completely to an adjusting element 1 that is embodied as a tailgate. The full scope of these explanations also applies for all other types of adjusting elements 1.

The drive arrangement is equipped with two electrical drives 2, 3 of which only the front drive 2 is visible in FIG. 1. The two drives 2, 3 are preferably embodied as spindle drives that operate in a linear manner and engage on the edge regions of a tailgate 1 on the one hand and on the other hand engage on a tailgate aperture. With respect to a preferred arrangement of the drives 2, 3, reference is made to the German Utility Model DE 20 2007 005 749 U1 that was filed by the applicant and as such becomes the subject matter of the present application.

Each drive 2, 3 is equipped with a drive motor 2a, 3a that is allocated in a conventional manner a progressive feed gear, in this case a spindle gear.

Figure 2:
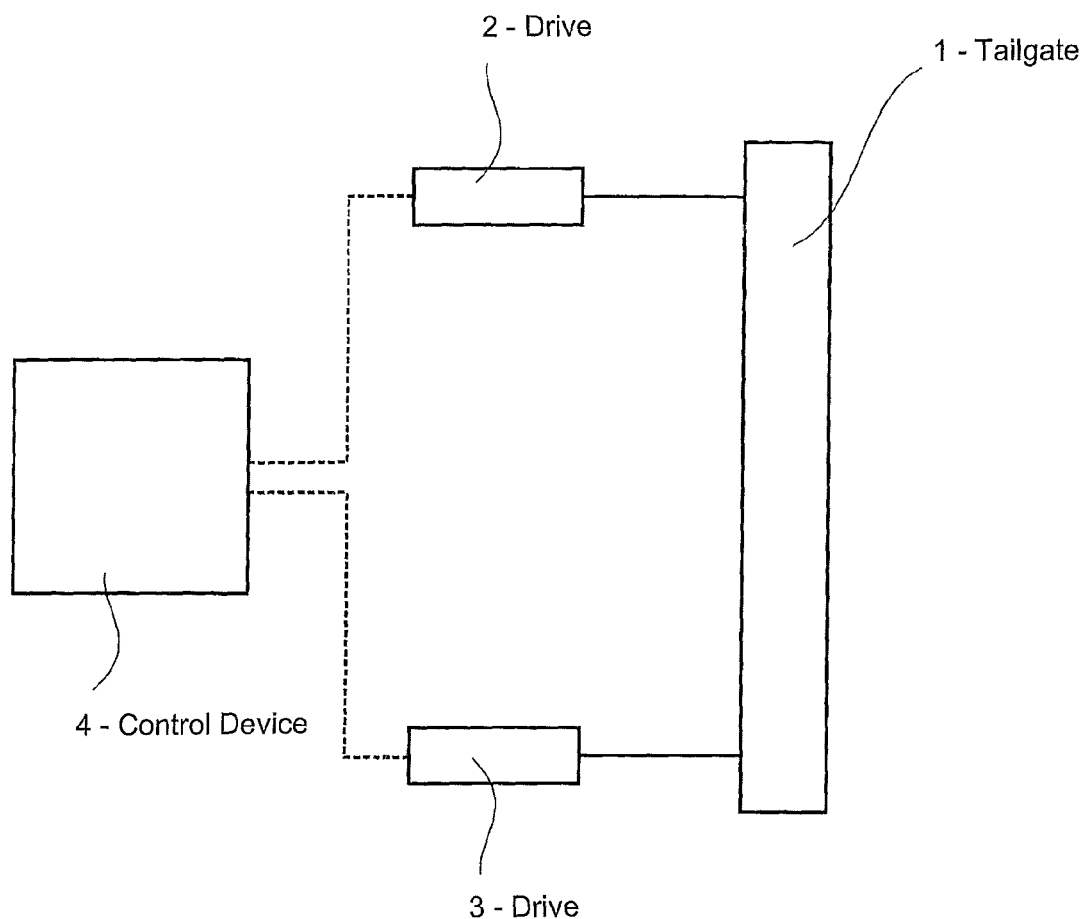
FIG. 2 shows a purely schematic block diagram of the drive arrangement as shown in FIG. 1.

The drive arrangement is moreover equipped with a control device 4 that is used to control the two drive motors 2a, 3a. The control device 4 is illustrated purely schematically in FIG. 2. Said control device can be embodied as a separate unit or as a component of a central electronics system of a motor vehicle. Also feasible is a decentralized embodiment having a plurality of control modules that are arranged in a distributed manner for example in the drives 2, 3.

In the assembled state, the two drives 2, 3 act in the same manner on the tailgate 1. This means that initially the tailgate 1 is adjusted to the identical adjustments of the two drives 2, 3. This means moreover that the two drives 2, 3 are embodied and arranged in such a manner that in the case of identical drive forces they introduce identical drive torques into the tailgate 1.

The drives 2, 3 are embodied in this case in an essentially identical manner apart from deviations that are a result of tolerances. This is to be broadly understood and includes for example also an embodiment of the drives 2, 3 in which they are a mirror-image of each other with respect to the vehicle longitudinal axis.

The control device 4 influences the two drive motors 2a, 3a with a pulse width modulation voltage ("PWM" voltage). Consequently, it is possible to control the drive rotational speed and/or the drive torque in a low-loss manner.

In a preferred embodiment, the control device 4 adjusts the PWM voltages of the two drive motors 2a, 3a so that the level of electrical power consumed by each of the two drive motors 2a, 3a is identical.

It is essential that the control device 4 influences the two drive motors 2a, 3a by PWM voltages having PWM switching frequencies that vary continuously during the adjustment process and in fact in such a manner that the PWM switching frequencies that are allocated to the two drive motors 2a, 3a are different at least for periods of time. The advantages associated therewith have been described in the general part of the description.

In a particularly preferred embodiment, it is the case that the PWM switching frequencies that are allocated to the two drive motors 2a, 3a are essentially constantly different. The term "essentially" means here that particularly in the case of the pseudo-random control of the switching frequencies that is still to be explained it is theoretically possible for the two PWM switching frequencies to be identical at points in time. However, the probability of this occurring is extremely small particularly in the case of the pseudo-random control that is still to be explained and can also be fully avoided by means of suitable measures. For example, for the case in which the frequency variations that are allocated to the two drive motors 2a, 3a and relate to a still-to-be-explained middle PWM switching frequency are identical, the algebraic sign, i.e. the direction, of one of the frequency variations is reversed.

In order to reduce the probability that the interference that is caused by the two drive motors 2a, 3a is not intensified or summated, it is further preferred that the PWM switching frequencies that lie opposite each other are independent of each other at least for periods of time. This independence is to be understood in a mathematical sense as mentioned above and is ensured by means of a corresponding algorithm in the control device 4.

However, it is also feasible that a correlation of the PWM switching frequencies that are allocated to the two drive motors 2a, 3a is achieved in a purposeful manner. A purposeful correlation of this type can on the other hand counteract any intensification of the interference that is caused by the two drive motors 2a, 3a.

It is preferred that the PWM switching frequencies that are allocated to the two drive motors 2a, 3a are constant in the case of a time-related averaging. It is further preferred that the average PWM switching frequencies that are allocated to the two drive motors 2a, 3a are identical. It is also feasible that these average PWM switching frequencies are different.

A PWM generator generally comprises a clock pulse generator and a counter that is allocated to the clock pulse generator, said counter being allocated a power switch. The counter switches the power switch for a predetermined number of clock pulses to "high" potential, wherein the predetermined number of clock pulses corresponds to the high duration period.

It is preferred in this case that the control device 4 for the two drive motors 2a, 3a comprises in each case a PWM generator (not illustrated) and in each case a pseudo-random generator, on which the respective frequency variation is based. The pseudo-random generator generates a pseudo-random number that is, for example, a measure of the frequency variation of a middle PWM switching frequency. In the case of the PWM generator having the clock pulse generator and counter, the randomly generated number can influence the count threshold of the counter. It is thus possible to perform the proposed frequency variation in an extremely simple manner.

The proposed frequency variation is preferably performed in a cyclic manner at a predetermined shift frequency. It is preferred in this case that the shift frequency lies in the region of 1 kHz.

The frequency variation can be achieved by way of example as "frequency hopping" or as "frequency sweeping". In the case of frequency hopping, the frequency variation is performed on the basis of a preferred cyclic jump between different PWM switching frequencies. In the case of frequency sweeping, on the other hand, the frequency variation is performed on the basis of the PWM switching frequency continuously rising and falling. In the latter case, the magnitude of the frequency variation in the time range can follow a triangular signal or a sawtooth signal. Other signal forms are feasible.

The PWM switching frequency preferably lies in the kHz range, whereas the shift frequency as discussed above preferably lies in the range of a few hundred Hz up to a few kHz. In particular, it has been proved and tested that the PWM switching frequency lies in a frequency band between 15 kHz and 25 kHz. The range between 100 Hz and 10 kHz, in particular between 200 Hz and 5 kHz, has been proved and tested for the shift frequency.

Fundamentally, the frequency variation can be performed by means of influencing the above-mentioned clock pulse generator of the PWM generator. However, there is also provided a mathematical solution for achieving the frequency variation, whereby it is provided that the frequency variation is performed on the basis of the high duration period or respectively the low duration period of the PWM pulses being shortened or lengthened respectively. At the same time, consideration is to be given to the fact that the PWM voltages are used primarily to control the rotational speed and/or the torque of the drive motors 2a, 3a.

Accordingly, the control device 4 is equipped with a power controller (not illustrated) that supplies electrical power in each case to the two drive motors 2a, 3a, wherein the frequency variation is performed in each case in such a manner that the supply of power remains uninfluenced.

When varying the frequency to a higher switching frequency it is accordingly necessary to ensure that the high duration time period is reduced in order to avoid more power being supplied.

According to a further doctrine that is likewise deemed to be an independent claim, the control device 4 of the proposed drive arrangement as such is claimed. With respect to possible advantages and embodiments, reference is made to the full scope of the explanations relating to the proposed drive arrangement.

According to a further doctrine that is likewise deemed to be an independent claim, a method for the motor-operated adjustment of an adjusting element 1 in a motor vehicle by means of a proposed drive arrangement is claimed. It is essential that the two drive motors 2*a*, 3*a* are influenced by the PWM voltages having PWM switching frequencies that vary continuously during the adjustment process in such a manner that the PWM switching frequencies that are allocated to the two drives are different at least for periods of time. This corresponds as mentioned above to the operating method of the proposed drive arrangement so that reference is made also in this respect to the above explanations with respect to all advantages and possible embodiments.

The invention claimed is:

1. A drive arrangement for the motor-operated adjustment of an adjusting element in a motor vehicle, wherein the drive arrangement comprises a control device and two electrical drives having in each case a drive motor, wherein in the assembled state the drives act in the same manner on the adjusting element and are embodied in an essentially identical manner apart from deviations that are a result of tolerances, wherein the control device influences the two drive motors with pulse width modulation ("PWM") voltages,
   wherein the control device influences the two drive motors by PWM voltages having PWM switching frequencies that vary particularly continuously in such a manner that the PWM switching frequencies that are allocated to the two drive motors are different from each other at least for periods of time.

2. The drive arrangement according to claim 1, wherein the control device adjusts the PWM voltages of the two drive motors so that the level of electrical power consumed by each of the two drive motors is identical.

3. The drive arrangement according to claim 1, wherein the PWM switching frequencies that are allocated to the two drive motors are continuously different.

4. The drive arrangement according to claim 1, wherein the control device generates the PWM switching frequencies that are allocated to the two drive motors in such a manner that the two resulting PWM switching frequencies are independent of each other at least for periods of time.

5. The drive arrangement according to claim 1, wherein the control device generates the PWM switching frequencies that are allocated to the two drive motors in such a manner that the resulting frequency variations are correlated with each other at least for periods of time.

6. The drive arrangement according to claim 1, wherein the PWM switching frequencies that are allocated to the two drive motors are constant in the case of a time-related averaging.

7. The drive arrangement according to claim 1, wherein the control device for the two drive motors comprises in each case a PWM generator and in each case a pseudo-random generator, on which the respective frequency variation is based.

8. The drive arrangement according to claim 1, wherein the frequency variation is performed in a cyclic manner at a predetermined shift frequency.

9. The drive arrangement according to claim 1, wherein the frequency variation is performed on the basis of a jump between different PWM switching frequencies, or in that the frequency variation is performed on the basis of the PWM switching frequency continuously rising and falling.

10. The drive arrangement according to claim 1, wherein the PWM switching frequency lies in the kHz range, and/or in that the shift frequency lies in a range between 200 Hz and 5 kHz.

11. The drive arrangement according to claim 1, wherein the PWM switching frequency lies in a frequency band between 15 kHz and 25 kHz.

12. The drive arrangement according to claim 1, wherein the frequency variation is performed on the basis of the high duration period or respectively the low duration period of the PWM pulses being shortened or lengthened respectively.

13. The drive arrangement according to claim 1, wherein the control device comprises a power controller that supplies electrical power in each case to the two drive motors and in that the frequency variation is performed in such a manner that the required power is supplied.

14. A control device for a drive arrangement for the motor-operated adjustment of an adjusting element in a motor vehicle, wherein the drive arrangement comprises two electrical drives having in each case a drive motor, wherein in the assembled state the drives act in the same manner on the adjusting element and are embodied in an essentially identical manner apart from deviations that are a result of tolerances, wherein the control device influences the two drive motors by pulse width modulation ("PWM") voltages,
   wherein the control device influences the two drive motors by PWM voltages having PWM switching frequencies that vary continuously during the adjustment process in such a manner that the PWM switching frequencies that are allocated to the two drive motors are different from each other at least for periods of time.

15. A method, comprising:
   adjusting an adjustment element in a motor vehicle by means of a drive arrangement, wherein the drive arrangement comprises a control device and two electrical drives having in each case a drive motor, wherein in the assembled state the drives act in the same manner on the adjusting element and are embodied in an essentially identical manner apart from deviations that are a result of tolerances, wherein the two drive motors are influenced by pulse width modulation ("PWM") voltages,
   wherein the two drive motors are influenced by PWM voltages having PWM switching frequencies that vary continuously during the adjustment process in such a manner that the PWM switching frequencies that are allocated to the two drive motors are different from each other at least for periods of time.

* * * * *